United States Patent [19]

Licciardi et al.

[11] Patent Number: 4,873,659
[45] Date of Patent: Oct. 10, 1989

[54] C-MOS ARITHMETIC - LOGIC UNIT WITH HIGH CARRY PROPOGATION SPEED

[75] Inventors: Luigi Licciardi, Almese; Alessandro Torielli, Torino, both of Italy

[73] Assignee: Cselt - Centro Studi E Laboratori Telecomunicazioni Spa, Torino, Italy

[21] Appl. No.: 186,897

[22] Filed: Apr. 27, 1988

[30] Foreign Application Priority Data

May 27, 1987 [IT] Italy ................ 67459 A/87

[51] Int. Cl.$^4$ .............................................. G06F 7/50
[52] U.S. Cl. ...................................... 364/784; 364/768
[58] Field of Search ..................... 364/768, 784, 786; 307/471, 472

[56] References Cited

U.S. PATENT DOCUMENTS

| | | | |
|---|---|---|---|
| 3,767,906 | 10/1973 | Pryor | 364/786 X |
| 3,932,734 | 1/1976 | Parsons | 364/786 |
| 4,071,905 | 1/1978 | Oguchi et al. | 364/784 |
| 4,435,782 | 3/1984 | Kaufman et al. | 364/784 X |
| 4,564,921 | 1/1986 | Suganuma | 364/784 |
| 4,709,346 | 11/1987 | Henlin | 364/784 |
| 4,713,790 | 12/1987 | Kloker et al. | 364/784 |

OTHER PUBLICATIONS

Steinlechner et al., "Carry-Save Adders and Their Application for a Multiplication with Factored Multiplicands", *Proceedings IEEE International Conference on Computer Design: VLSI in Computers*, New York, Oct. 7-10, 1985, pp. 359-362.

Primary Examiner—Gary V. Harkcom
Assistant Examiner—Tan V. Mai
Attorney, Agent, or Firm—Herbert Dubno

[57] ABSTRACT

The arithmetic-logic unit has elementary cells performing logic addition, one for each pair of operand bits, which are particularly optimized as far as carry propogation speed is concerned and are controlled by an auxiliary fast logic allowing their performance to be extended to the other operations. The unit also has a control signal generating circuit, subdivided into a first part (DEC1), near the elementary cell of least significant position, which generates an operation selecting signal for all the cells, and into a second part (DEC2), near the elementary cell of most significant position, which generates control signals for the auxiliary logic of each elementary cell.

6 Claims, 6 Drawing Sheets

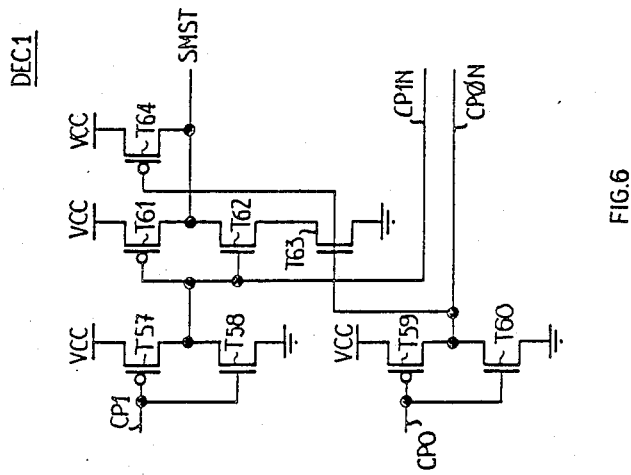
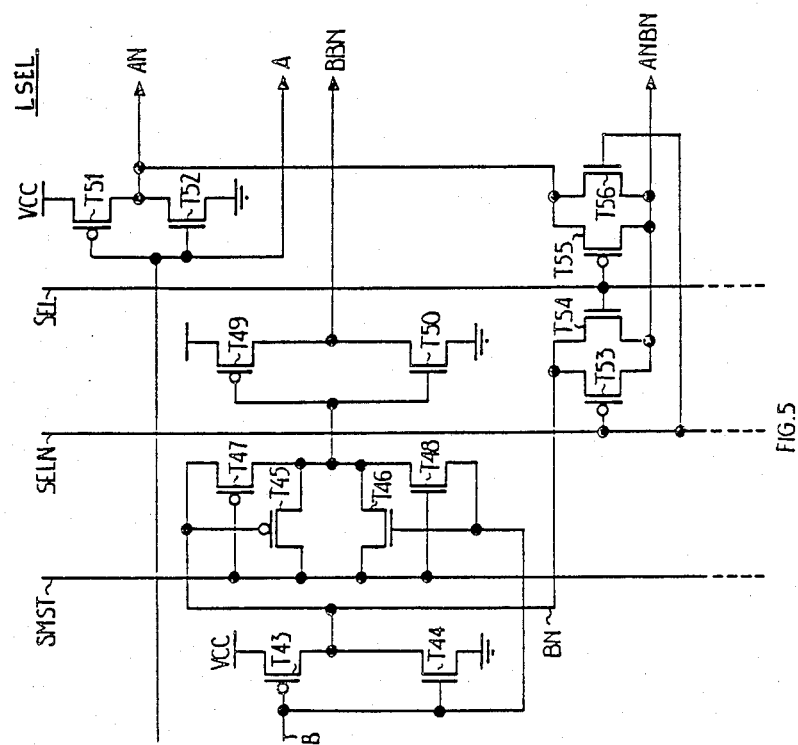
FIG.6
FIG.5

C-MOS ARITHMETIC - LOGIC UNIT WITH HIGH CARRY PROPOGATION SPEED

FIELD OF THE INVENTION

Our present invention relates to integrated circuits and, more particularly, to a C-MOS arithmetic-logic unit for executing operations of addition, subtraction, minimum and comparison with a threshold.

BACKGROUND OF THE INVENTION

In many applications the necessity of increasing computation speed and optimizing the number of transistors and the occupied area makes the use of traditional integrated arithmetic logics more and more problematical.

One of such application is the implementation an operative unit usable in calculating known dynamic programming algorithms. Such algorithms, intensively used in the methods of speech and image recognition, consist of a very limited set of elementary logic and arithmetic operations which are to be repeated often and quickly in real time.

The most widely used technique in arithmetic logic design implements minimized Boolean equations, obtained by applying Karnaugh maps to the truth tables of the functions to be carried out, by suitable combinations of known elementary logic gates, such as NAND, NOR, NOT, EX-OR. Each elementary logic gate is then transformed into the equivalent transistor circuit in the desired technology, for example in integrated MOS technology. Finally, geometric dimensioning of the individual transistors of the structure to be integrated is performed.

The arithmetic-logic unit of the invention can be treated as a circuit performing the logic addition, integrated it by a suitable additional circuitry.

The adders known in the art have a structure composed of equal addition cells, whose number is equal to the dimension of the operands and whose carry propagates from the cell of lower weight to that of higher weight, crossing the various logic levels of each cell. The result will be stable at the output only at the end of the path of the carry signal.

Hence the carry signal propagation time limits computational speed, particularly when the operands have considerable dimensions and, as a consequence, the number of logic levels to be crossed is high.

This is due to the fact that in the known circuits the carry signal at a cell output generally feeds a considerable number of transistor gates of the subsequent cell.

Thus the switching time is relatively high due to the equivalent parasitic capacity that the output of the carry signal sees at the input of the subsequent cell. This capacity is proportional to the number of transistor gates at the input.

The problem deriving from the propagation time of the carry signal has been solved in Italian patent application entitled: "Sommatore veloce in tecnologia C-MOS" (Fast C-MOS adder), filed on 20 May 1987 in the name of the same Applicant (Application No. 67440 A-87, corresponding to the copending U.S. application Ser. No. 07/186,895 filed Apr. 27, 1988). This patent application describes an elementary cell performing logic addition between two operand bits with carry propagation in C-MOS technology which basically comprises:

a first EX-OR logic gate which receives said operand bits A, B;

a first inverter which receives an input carry Cin;

a second inverter which receives the output of said first EX-OR logic gate;

a first transfer gate which receives at the transfer input and output of said first inverter, and which is controlled by the logic input and output levels of said second inverter; a second EX-OR logic gate which receives the input carry Cin and the output of said second inverter, and supplies the result S of the addition; and a first pair of P-MOS transistors in series and a second pair of N-MOS transistors in series, said first and second pair being connected in series between two reference voltages, the bit of the first operand A being sent to the gate of a transistor of both pairs, the bit of the second operand B being sent to the gate of the other transistor of both pairs, the common node of said two pairs being connected to the output of said first transfer gate and supplying the output carry CoutN complemented.

Yet the problem relevant to computational speed remain unresolved for the portion of circuit which is to perform all the other operations in the unit, and chiefly for the circuit which generates internal control signals of selection of the operation and of the result at the output. This circuit in fact uses the carry signal at the adder output to generate control signals.

Moreover, collateral problems of load balancing on parallel circuit branches, which are connected with the two operands, arise as well as problems of physical displacement of the control circuit in the integrated structure, still with the aim of increasing computational speed.

OBJECT OF THE INVENTION

It is the object of the invention to provide an improved C-MOS arithmetic logic unit which overcomes the above-mentioned drawbacks.

SUMMARY OF THE INVENTION

These problems are solved by the present invention of a C-MOS arithmetic-logic unit for carrying out operations of addition, subtraction, minimum and comparison with a threshold, which is directly derived from the truth table of the relevant logic operations by exploiting to the maximum the electric properties of the complementary logic of the C-MOS technology, without using the Karnaugh maps, and in which the number of MOS transistors of the N or P type is considerably reduced, thus also reducing the number of gates to be driven at the input of each logic level.

Thus a limited-complexity high-speed circuit is obtained, which is particularly suited to integration in a LSI microprogrammed processing stucture.

The unit provided by the invention completes the adder structure, described in the cited pending patent application, with a control signal generating circuit, subdivided into two portions physically placed at the two ends of the adding circuit wherein input and output carry signals are present, and with input/output selecting circuits, particularly fast to shorten internal propagation times.

A C-MOS arithmetic-logic unit according to the invention for calculating addition and subtraction minima between two operands A and B, and comparison between a datum and a threshold, wherein addition and subtraction operations are carried out by a carry-propogating adder consisting of elementary cells, one cell for each bit of the two operands, the cells being cascade-connected for carry propogation. Each elementary cell basically comprises:

a first EX-OR logic gate receiving the bits of the operands;

a first inverter which receives an input carry;

a second inverter which receives the output of the first EX-OR logic gate;

a first transfer gate which receives at the transfer input of the first inverter, and which is controlled by input and output logic levels of the second inverter;

a second EX-OR logic gate which receives the input carry and the output of the second inverter, and supplies the addition result;

a first pair of series-connected P-MOS transistors and a second pair of series-connected N-MOS transistors, the first and second pair being connected in series between two reference voltages, a bit of the first operand (A) being applied to gates of respective transistors of both pairs, the bit of the second operand (B) being brought to the gate of the other transistor of both pairs, the common node of the two pairs being connected to the output of the first transfer gate and supplying an output carry.

For minima and comparison operations the elementary cells perform subtraction and individually further comprise:

third and fourth transfer gates which receive at the transfer input the first and second operand respectively, and have a common transfer output, and which are controlled by a first and second control signal which in case of a minimum operation transfer to the output the inferior operand on the basis of the carry level outgoing from the last cell, and in case of comparison the first operand;

third and fourth P-MOS transistors and fifth and sixth N-MOS transistors, all connected in series between the two reference voltages, the third and fifth transistors receiving at the gate the result from the relevant elementary cell, the fourth and sixth transistors receiving at the gate a third and a fourth control signal; and seventh and eighth P-MOS transistors and ninth and tenth N-MOS transistors, all connected in series between the two reference voltages, the points common to the third, fourth and the seventh and eighth transistors being interconnected, the intermediate points in the series between the eigth and ninth and between the fourth and fifth transistors being interconnected to supply an output of the unit, the eightht and tenth transistors receiving at the gate the common transfer output, the seventh and ninth transistors receiving at the gate the fourth and third control signals respectively, the control signals taking up such logic levels that the output:

in case of addition or subtraction, if there is no saturation, is the result, otherwise it is a state indicative of saturation.

in case of minimum, it is the common transfer output; and in case of comparison, if there is no saturation, it is the transfer output, otherwise it is the state indicative of saturation.

The arithmetic-logic unit can further comprise a control signal generating circuit, subdivided into a first part located close to the least significant elementary cell for generating the first, second, third and fourth control signals.

The operation code can have the following values: for the addition "00", for the subtraction "01", for the minimum "1", for the comparison "10", characterized in that the first control signal has "0" value for the comparison operation and output carry from the last cell for the minimum operation, the second control signal being the complement of the first; and third control signal is "0" for addition and subtraction operation, "1" for minimum operation and the complemented carry outgoing from the last cell for comparison operation; the fourth control signal is "0" for minimum and comparison operations, "1" for subtraction, and the carry complemented outgoing from the last cell for the addition.

The first part of the control signal generating circuit comprises third and fourth logic inverters which generate complemented values of the most and least significant bits of the operation code and which feed a NOR logic gate generating the addition or subtraction selecting signal.

The second part of the control signal generating circuit can comprise:

eleventh and twelfth P-MOS transistors in series between supply voltage and the input of a fifth inverter generating the third control signal, the gates of the eleventh and twelfth transistors receiving respectively the carry complemented of the last cell and the least significant bit of the operation code;

thirteenth and fourteenth P-MOS transistors in series between the supply voltage and the input of sixth inverter generating the fourth control signal, the gates of the thirteenth and fourteenth transistors receiving respectively the last cell carry complemented and the least significant bit of the operation code;

a fifteenth P-MOS transistor and sixteenth and seventeenth N-MOS transistors, all connected in series between supply voltage and the ground, the common point between the fifteenth and the sixteenth transistors being connected to the input of the fifth inverter, the gates of the fifteenth and sixteenth transistors receiving the most significant bit and the gate of the seventeenth transistor receives the least significant bit of the operation code; and an eighteenth P-MOS transistor and nineteenth and twentieth N-MOS transistors, all connected in series between the supply voltage and ground, the point common between the eighteenth and nineteenth transistors being connected to the input of the sixth inverter, the gates of the eighteenth and nineteenth transistors receiving the most significant bit complemented and the gate of the twentieth transistor receiving the least significant bit of the operation code, the common points of the nineteenth and twentieth transistors being interconnected.

The state indicative of saturation is a logic level "1".

BRIEF DESCRIPTION OF THE DRAWING

The present invention will be come more readily apparent from the description of a preferred embodiment thereof given by with reference to accompanying drawing

FIG. 5 is a detailed circuit diagram of block LSEL represented in dashed lines in FIG. 2; and FIGS. 6 and 7 represent detailed circuit diagrams of blocks DEC1 and DEC2 of FIG. 1.

SPECIFIC DESCRIPTION

Figure 1:
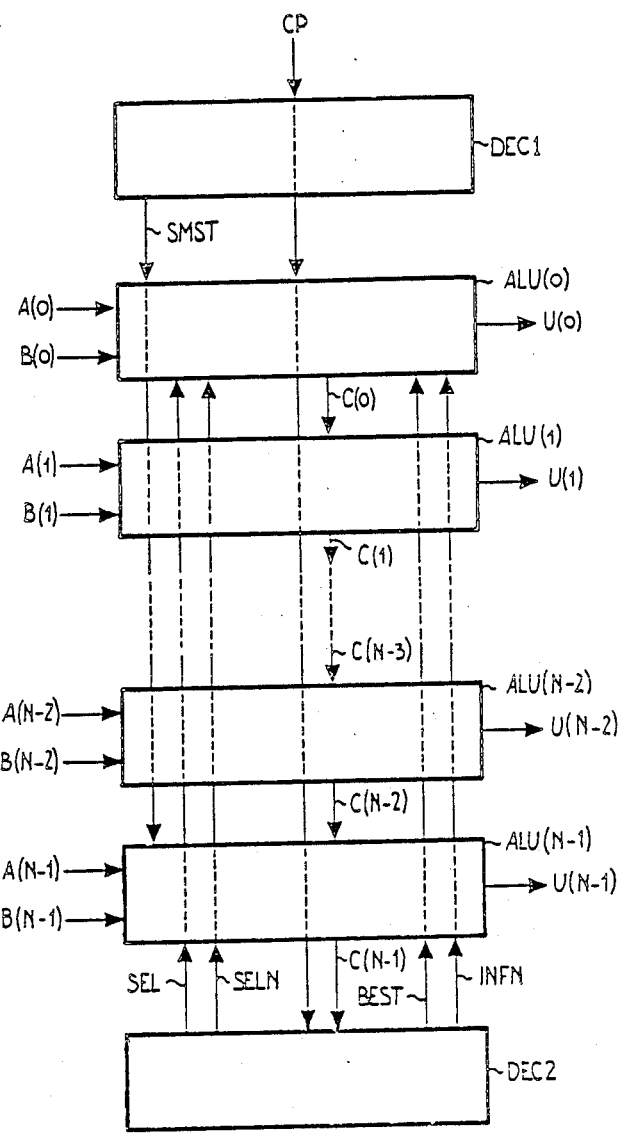
FIG. 1 is a block diagram of the unit according to the invention.

FIG. 1 shows the unit subdivided into N computing cells ALU(n), one per each pair of operand bits A(n), B(n) at the input, which provide a result U(n), N ($0 < n < N-1$) being the operand and result size.

DEC1 denotes a first part of the control signal generating circuit, and DEC2 a second part. DEC1 is placed near the computing cell ALU(0), while DEC2 near the computing cell ALU(N−1).

DEC1 receives a 2-bit operation code and basically generates both an addition-or-subtraction selecting signal SMST which is propogated to all the computing cells ALU, while complementary values propagats together with the true values to DEC2. Signal SMST is also supplied to the first cell ALU(0) as an input carry signal.

DEC2 receives true and complemented values of the operation code CP and the output carry signal C(N−1) of the cell ALU(N−1), and generates control signals SEL, SELN, BEST, INFN which are propogated to all the computing cells ALU.

The arithmetic-logic unit carries out the following operations:

| Operation | Result |
|---|---|
| addition A + B | U = S (with saturation) |
| subtraction A − B | U = S |
| minimum between A and B | |
| if A > B | U = B |
| if A < B | U = A |
| comparison between datum and threshold | |
| if datum > threshold | U = infinity |
| if datum < threshold | U = datum | where S denotes the adder output.

Figure 2:
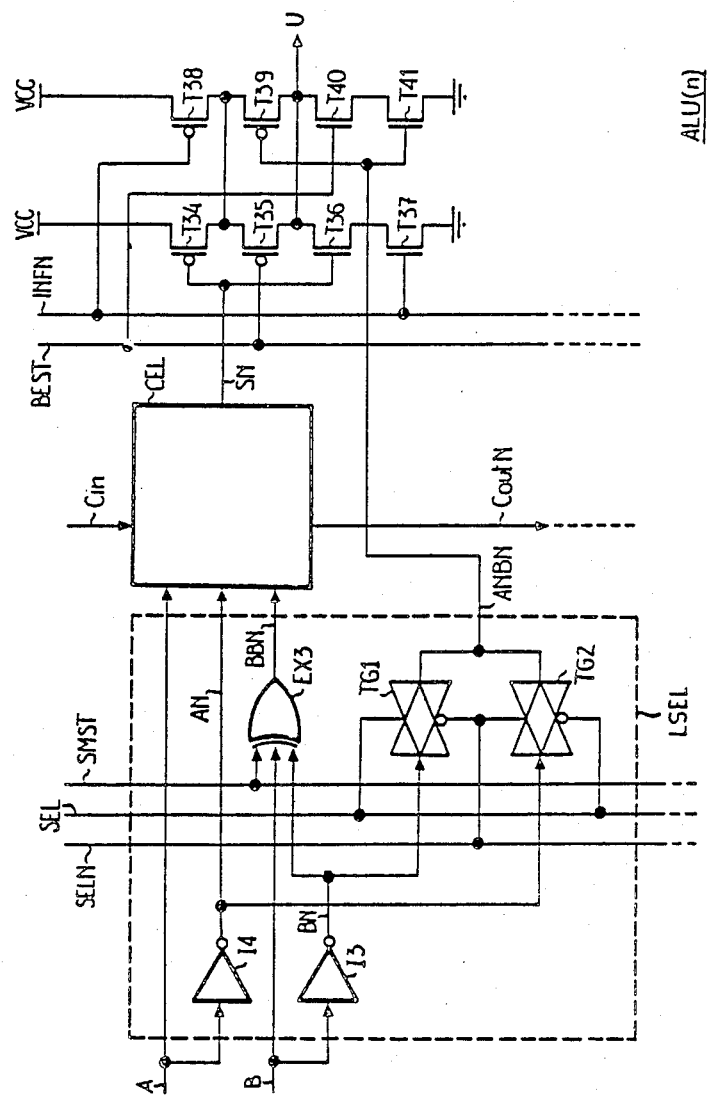
FIG. 2 is an embodiment of one of the computing cells ALU(n) of the unit.

In FIG. 2 CEL denotes a elementary cell performing logic addition, as described in the above-cited patent applications CEL requires at the inputs the true and complemented levels of one of the two operands, e.g. A and AN, a second operand, denoted by BBN, and an input carry Cin (denoted by C(n−1) in FIG. 1) coming from the computing cell ALU(n−1), and generates the addition result SN and an output carry CoutN (denoted by C(n) in FIG. 1) of logic level complemented. As will be described with reference to FIGS. 3 and 4, two embodiments of elementary cell CEL are provided. They are to be connected alternately with respect to the carry signal path to recover the carry logic-level inversion occurring in each cell.

By adding an EX-OR logic gate, denoted by EX3, the addition cell can also execute the subtraction. In fact by sending operand B and signal SMST to EX3 inputs, SMT logic-level determines the operation to be carried out, sending onto the output BBN B true level for the addition, and B complemented level for the subtraction. In addition the signal SMST is also supplied to the carry input of cell ALU(0).

The adder-substractor obtained in this way can be advantageously used as a core of the arithmetic unit, since minimum and comparison operations can be reduced to particular subtraction cases wherein the result is controlled by the carry of the last cell C(N−1). In fact by choosing the subtraction, the level of C(N−1) indicates whether A>B or vice versa. Hence carry C(N−1) and control signals SEL, SELN, BEST, INFN control the auxiliary logic of FIG. 2, present in each cell ALU, providing at the output U the addition or subtraction result performed by CEL, or the operand A or B present on wire ANBN, or a saturation level indicating the condition of infinity or of datum exceeding threshold (all logic 1s).

As a function of the operation to be carried out, control signals SMST, SEL, BEST, INFN assume the following values:

| Operation | SMST | INFN | BEST | SELN | Operation Code CP |
|---|---|---|---|---|---|
| A + B | 0 | CN(N-1) | 0 | — | 00 |
| A − B | 1 | 1 | 0 | — | 01 |
| min(A, B) | 1 | 0 | 1 | CN(N-1) | 11 |
| threshold comparison | 1 | 0 | CN(N-1) | 1 | 10 |

As shown by the table, control signals INFN, BEST, SELN sometimes assume the complemented value CN(N−1) of the carrying signal of the last cell. Hence the necessity of disposing of a very fast adder, since only at computing end the carry signal and hence correct control of output U is attained.

Blocks DEC1 and DEC2 have been suitably positioned to reduce to the minimum the effect of propagation time of generating signals upon generated signals: in fact DEC1 position renders immediately available, without waiting for the propagation of code CP through the unit and before carrying out the operation, i.e. when actually useful, signal SMST which does not depend on C(N−1); DEC2 position however allows immediate availiability of signal C(N−1), without necessity of backpropagating it towards DEC1, to generate result control signals INFN, BEST, SEL, SELN, which actually are useful at the computation end.

Besides, in case N is even, i.e. for a number of odd cells, owing to repeated level inversions of the carry signal, a further logic inversion is to be performed to recover the correct polarity of C(N−1) complemented in the circuit generating the control signals.

TG1 and TG2 denote pairs of N-MOS and P-MOS transistors, implementing transfer gates, letting the input datum be transferred or not in function of the logic level at transistor gates, whereby they are implemented. TG1 and TG2 are enabled by signals SEL and SELN.

TG1 inhibits or enables the passage of the operand BN, which is complementary to B, through logic inverter I3, TG2, however, inhibits or does not the passage of operand AN, which is complementary to A, through inverter I4. The outputs of two transfer gates are interconnected and denoted by ANBN.

T34, T35, T36, T37 denote transistors connected in series between supply voltage Vcc and ground; T34 and T35 are of the P-MOS type while T36 and T37 are of the N-MOS type; the gates of T34 and T36 receive the result Sn from cell CEL, T35 gate receives signal BEST, T37 gate receives signal INFN.

T38, T39, T40, T41 denote transistors connected in series between supply voltage Vcc and ground; T38 and T39 are of P-MOS type while T40 and T41 are of N-MOS type: T39 and T41 gates receive signal ANBN, while T38 gate receives signal INFN and T40 gate receives signal BEST. Intermediate points between T34, T35 and T38, T39 channels are interconnected, as well as those between T35, T36 and T39, T40 channels to generate output U.

Gates I3, I4, EX3, TG1, TG2 form the block LSEL surrounded by dashed lines in the Figure.

Figure 3:
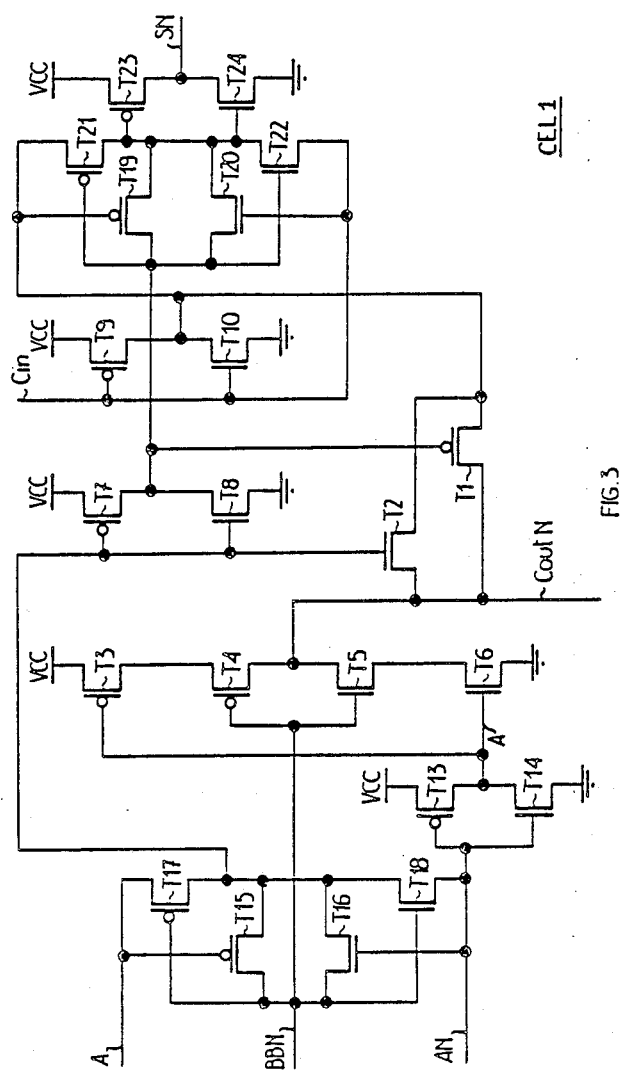
FIG. 3 is a detailed circuit diagram of a first embodiment of the elementary cell CEL of FIG. 2, denoted by CEL1.

FIG. 3 shows a first example of detailed circuit embodiment of the elementary cell CEL, denoted by CEL1, used in computing cells ALU in even position.

T1, T3, T4 denote P-MOS transistors, while T2, T5, T6 denote N-MOS transistors.

The channels of transistors T3, T4, T5, T6 are connected in series between supply voltage Vcc and ground T3 and T6 gates are fed with operand A, while T4 and T5 are fed with operand BBN. It is to be noted that operand A could be already available at the relevant input of CEL1, but it is better obtained by a further complementing operation of input AN, performed by the inverter formed by transistors T13, T14, which are P-MOS and N-MOS respectively. For reasons of symmetry with the other type of elementary cell (shown in FIG. 4 where inverter T11, T12 is present) and of load balance between the two inputs A, AN.

The channels of transistors T1 and T2 are connected in parallel to form a transfer gate to whose input a carry signal Cin is applied through an inverter (necessary to carry out the decoupling function) consisting of transistors T9 and T10 which are P-MOS and N-MOS respectively. The output of said transfer gate is connected to the connection point between T4 and T5 channels to generate carry signal CoutN complemented.

T15, T17 denote P-MOS transistors and T16, T18 N-MOS transistors, implementing an EX-OR gate to whose inputs operands A and BBN are sent and which produces at the output a signal passing to active logic level if A≠BBN, and which is applied then to T2 gate directly and to T1 gate through an inverter consisting of T7 and T8, which are P-MOS and N-MOS transistors, respectively.

T15 and T16 channels are connected in parallel. The input of these said channels is connected to T17, T18 gates and receives the operand BBN, while the output is connected to connection point of T17, T18 channels, which are connected in series, and is the output of EX-OR gate; T15 gate is connected to T17 gate and receives operand A; T16 gate is connected to T18 gate and receives complement AN of operand A.

T19, T21 denote P-MOS transistors, T20, T22 N-MOS transistors implementing an EX-OR gate to whose inputs are sent carry signal Cin and the output of inverter T7, T8 to generate result S which is hence level-inverted in the inverter-buffer consisting of transistors T23, T24, which are respectively P-MOS and N-MOS, to obtain signal SN.

T19 and T20 channels are connected in parallel. The input of these channels is connected to T21, T22 gates and receives the output of inverter T7, T8, while the output is connected to the connection point of T21, T22 channels which are connected in series, and is the output of EX-OR gate; T20 gate is connected to T22 channel and receives input carry Cin; T19 gate is connected to T21 channel and receives the output of inverter T9, T10.

The pairs of transistors T7, T8; T9, T10; T13, T14; T23, T24 are connected likewise, i.e. they have the gate in common and form the gate input, the channels in series between supply voltage and ground, and the output extracted between the two channels.

When A=B, transfer gate is inhibited, while the output of the circuit branch formed by transistors T3, ... T6 carries the complemented value of the inputs, denoted by CoutN.

When, however, A≠B, the circuit branch T3, ... T6 is inhibited, while transfer gate is enabled, supplying at the output the complemented value of input Cin, i.e. still CoutN.

Figure 4:
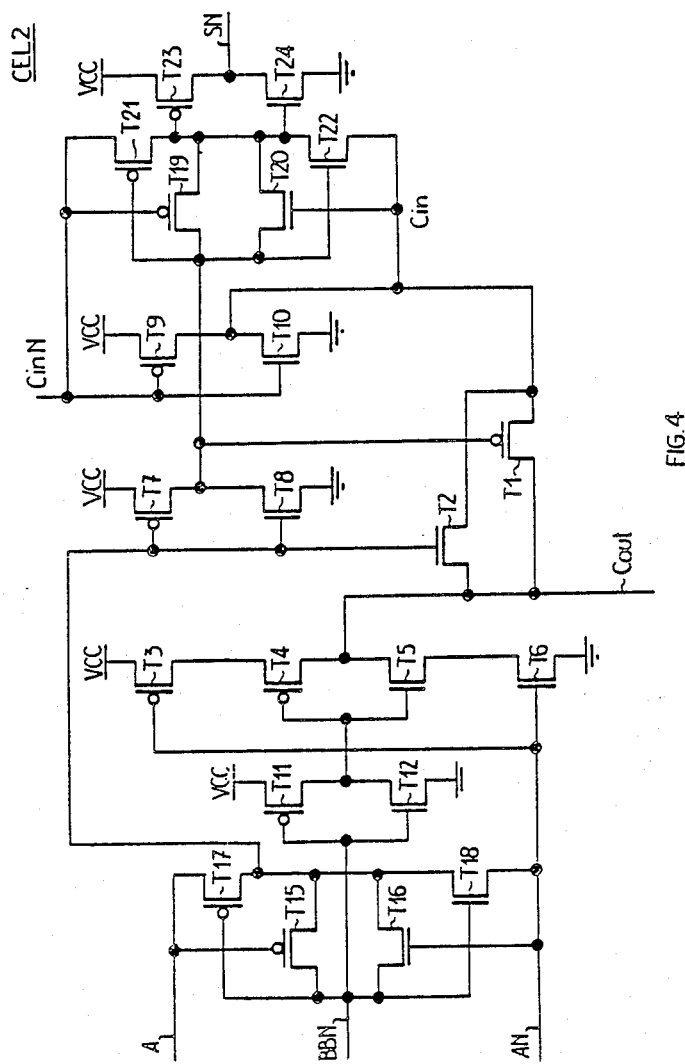
FIG. 4 is a detailed circuit diagram of an alternate embodiment of the elementary cell CEL of FIG. 2, denoted by CEL2.

FIG. 4 shows a second example of the detailed circuit of the elementary cell CEL, denoted by CEL2, used in computing cells ALU of odd position.

The first variation with respect to the diagram of FIG. 3, to whose description one can refer for parts common to the diagrams, is that input carry Cin is brought at T19 gate (connected to T21 channel), while the common point to T9 and T10 channels is brought to T20 gate (connected to T22 channel). Hence the variation with respect to FIG. 3 consists of the exchange between the two inputs of EX-OR gate supplying the result.

The second variation consists in supplying T3 and T6 gates with the value AN complemented, and in supplying T4 and T5 gates the BBN value complemented, extracted from the output of the inverter consisting of transistors T11 and T12, respectively P-MOS and N-MOS, to whose input is sent BBN.

In FIG. 5, T43, T44 denote P-MOS and N-MOS transistors forming inverter I3 (FIG. 2) inverting operand B and generating BN. T51, T52 denote P-MOS and N-MOS transistors implementing inverter I4 (FIG. 2), which inverts operand A and generates AN.

T45, T47 denote P-MOS transistors, T46, T48 N-MOS transistors implementing EX3 gate (FIG. 2) to whose inputs there are sent signal SMST and the input and output of the inverter I3 (signals B, BN), and whose output is level inverted in the inverter-buffer formed by transistors T49, T50, which are respectively of P-MOS and N-MOS type, to obtain signal BBN.

T45 and T46 channels are connected in parallel. The input of these channels is connected to the gates of T47, T48 and receives the signal SMST, while the output is connected to the connection points of T47, T48 channels which are connected in series, and is the output of EX-OR gate; T46 gate is connected to T48 channel and receives operand B; T45 gate is connected to T46 channel and receives output BN of inverter I3.

P-MOS transistor T53 and N-MOS transistor T54 implement transfer gate TG1. They have channels in parallel and receive signal BN. Signal SEL is brought to T54 gate, signal SELN is brought to T53 gate: condition SEL=1 and SELN=0 enables TG1 and BN is transferred to the output.

P-MOS transistor T55 and N-MOS transistor T56 implement transfer gate TG2. They have parallel channels and receive signal AN. Signal SEL is brought to T55 gate, signal SELN is brought to T56 gate: condition SEL=0 and SELN-=1 enables TG2 and AN is transferred to the output.

TG1 and TG2 outputs consist of the combined channel outputs of T53, T54, T55, T56.

The pairs of transistors T43, T44; T49, T50; T51, T52 are connected likewise, i.e. they have a common gate which is the input, the channels in series between supply voltage and ground, and the output extracted from the two channels.

In FIG. 6 T57, T58 denote P-MOS and N-MOS transistors which implement an inverter inverting the most significant bit CP1 of the operation code CP and generates signal CP1N. T59, T60 denote P-MOS and N-MOS transistors implementing an inverter which inverts the least significant bit CP0 of the operation code CP and generates signal CP0N.

The pairs of transistors T57, T58; T59, T60 are connected in a similar manner, i.e. they have the gate in common which is the input, the channels in series between supply voltage and ground, and the output extracted between the two channels.

T61 denotes a P-MOS transistor, T62, T63 two N-MOS transistors, connected in series between supply voltage Vcc and ground. T61 and T62 gates receive signal CP1N, while T63 gate receives signal CP0N. T64 denotes a P-MOS transistor, whose channel is connected between supply voltage Vcc and the common point to T61, T62 channels, wherefrom signal SMST is extracted; T64 gate receives signal CP0N.

T61 , . . . T64 implement an NAND gate.

Figure 7:
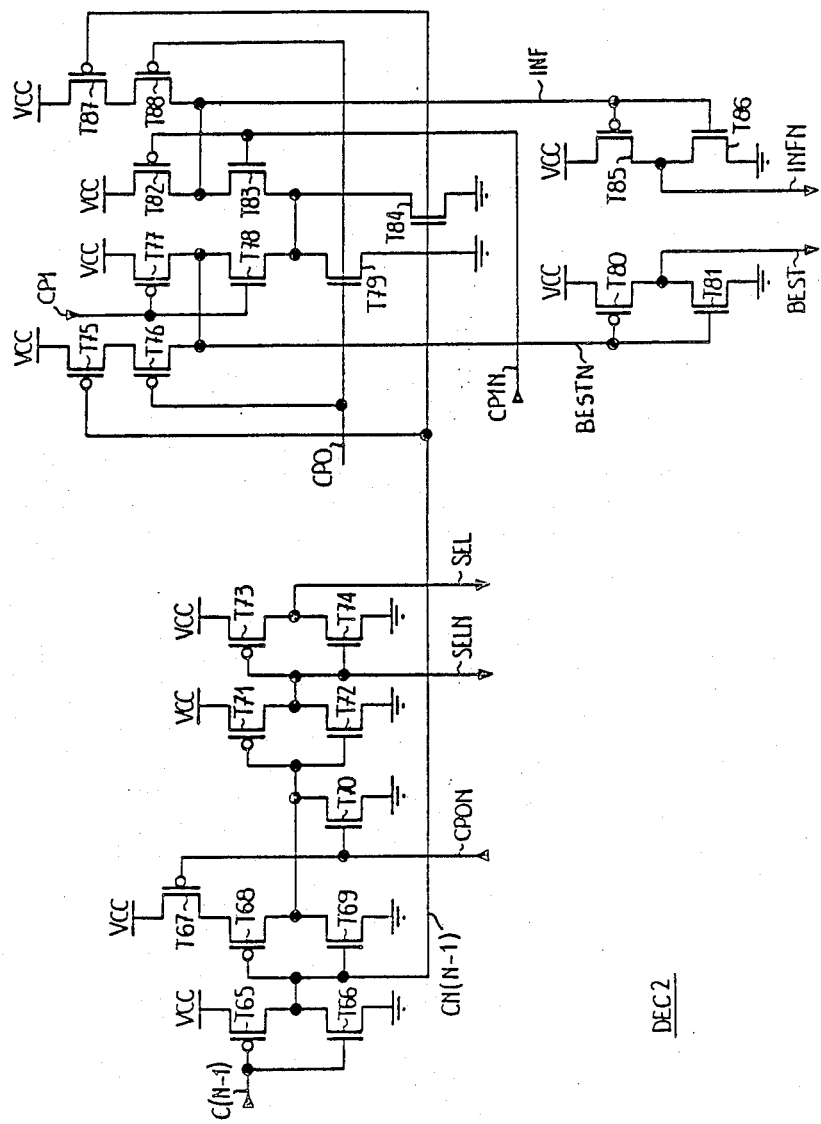

In FIG. 7 T65, T66 denote P-MOS and N-MOS transistors implementing an inverter inverting sign bit C(N−1) deriving from the last cell ALU(N−1) (FIG. 1), and obtains signal CN(N−1). This inverter is unnecessary for odd N since the sign bit outgoes already complemented by the last cell.

References T67, T68 denote two P-MOS transistors and T69 a N-MOS transistor, all connected in series between supply voltage Vcc and ground. T68 and T69 gates receive signal CN(N−1), while T67 gate receives signal CP0N. T70 denotes an N-MOS transistor, whose channel is connected between the point common to T68, T69 channels and ground; T70 gate receives signal CP0N.

T67 , . . . T70 implement a NOR gate whose output is extracted from the point common to T68, T69 channels.

References T71, T72 and T73, T74 denote pairs of P-MOS and N-MOS transistors implementing two cascade-connecting inverters.

The pairs of transistors T65, T66; T71, T72; T73, T74 are likewise connected, i.e. they have the gate in common, which is the input, channels connected in series betwen supply voltage and ground, and the output extracted between the two channels.

NOR gate output feeds the input of inverter T71, T72, from the output of which signal SELN is extracted; signal SEL is extracted from inverter T73, T74.

T75, T76 denote two P-MOS transistors connected in series between supply voltage Vcc and input BESTN of an inverter formed by P-MOS and N-MOS transistors T80, T81, from whose output signal BEST is extracted. Signal CN(N−1) is brought to T75 gate, while signal CP0 is brought to T76 gate.

T87, T88 denote two P-MOS transistors connected in series between supply voltage Vcc and input INF of an inverter consisting of P-MOS and N-MOS transistors T85, T86, from whose output signal INFN is extracted. Signal CN(N−1) is brought to T87 gate, while signal CP0 is brought to T88 gate.

T77 denotes a P-MOS transistor and T78, T79 two N-MOS transistors, all connected in series between supply voltage Vcc and ground. T77 and T78 gates receive signal CP1, while T79 gate receives signal CP0. The intermediate point between T77, T78 channels is connected with the input of inverter T80, T81.

T82 denotes a P-MOS transistor and T83, T84 two N-MOS transistors, all connected in series between supply voltage Vcc and ground. T82 and T83 gates receive signal CP1N, while T84 gate receives signal CN(N−1). The intermediate point between T82, T83 channels is connected with the input of inverter T85, T86.

Intermediate points between T78, T79 and T83, T84 are interconnected. The pairs of transistors T80, T81; T85, T86 are likewise connected, i.e. they have the gate in common, which is the input, the channels connected in series between supply voltage and ground, and the output extracted between the two channels.

The circuit consisting of transistors T75 , . . . T79, T82 , . . . T84, T87 and T88 implements the following logic functions:

| INF = | [ CN(N-1) or CP0 ] NAND CP1N |
|---|---|
| BESTN = | [ CN(N-1) OR CP0 ] NAND CP1 | corresponding to the following truth table:

| CP1N | CP0 | CN(N-1) | CP1 | INF | BESTN |
|---|---|---|---|---|---|
| 0 | 1 | — | 1 | 1 | 0 |
| 1 | 1 | — | 0 | 0 | 1 |
| — | 0 | 0 | — | 1 | 1 |
| 0 | — | 1 | 1 | 1 | 0 |
| 1 | — | 1 | 0 | 0 | 1 |

The operation of the circuit provided by the invention will be now briefly described with particular reference to FIG. 1.

In case of addition, if there is no saturation [C(n−1)=0, INFN=1, BEST=0], the circuit branch of transistors T34 , . . . T37 is enabled, while T38, T40 are inhibited, hence the output U supplies result SN of CEL complemented: in fact T35 and T37 are enabled and the inverter consisting of transistors T34 and T36 implements U=S.

If however there is saturation [C(n−1)=1], transistors T38 and T35 are conducting, setting output U to 1 (saturation condition), while T37 and T40 are inhibited.

In case of subtraction (INFN=1, BEST=0), circuit branch of transistors T34,...T37 is enabled, while T38, T40 are inhibited. Hence output U supplies the subtraction result SN complemented. In fact T35 and T37 are enabled and the inverter consisting of transistors T34 and T36 implements U =S.

In case of minimum operation (INFN=0, BEST=1) T35 and T37 are inhibited. The C(N−1) value, through signals SEL, SELN, enables transfer gate TG1, or TG2.

If C(N−1)=1, then A>B TG1 is conducting and ANBN=BN. If, however C(N−1)=0, then A<B; TG2 is conducting, and ANBN=AN. The circuit branch of transistors T38 , . . . T41 is enabled, then output U supplies ANBN value complemented: in fact since T38 and T40 are enabled, the inverter consisting of transistors T39, T41 implements U=$\overline{ANBN}$, so U=A or B.

In case of the operation of comparison with a threshold [INFN=0, BEST=CN(N−1)] the datum is assumed to be applied to input A and the threshold to input B. Transfer gate TG2 is always enabled, while TG1 is always inhibited, putting ANBN =AN.

If C(N−1)=0 [BEST=1], then the datum is less than threshold; the circuit branch of transistors T38 , . . . T41 is enabled, hence the output U supplies ANBN value complemented: in fact since T38 and T40 are enabled, the inverter consisting of transistors T39, T41 implements U=$\overline{ANBN}$=A, while T35 and T37 are cut off.

If C(N−1)=1 [BEST=0], then the datum is higher than threshold; transistors T37 and T40 are cut off, while T38 and T35 conduct setting the output U to 1 (saturation condition).

We claim:

1. A C-MOS arithmetic-logic unit for calculating addition and subtraction minima between two operands A and B, and comparison between a datum and a threshold, wherein addition and subtraction operations are carried out by a carry-propogating adder consisting of elementary cells, one cell for each bit of the two operands, said cells being cascade-connected for carry propogation, each elementary cell basically comprising:

a first EX-OR logic gate (T15, T16, T17, T18) receiving said bits of said operands (A, B);

a first inverter (T9, T10) which receives an input carry;

a second inverter (T7, T8) which receives the output of said first EX-OR logic gate;

a first transfer gate (T1, T2) which receives at the transfer input of said first inverter, and which is controlled by input and output logic levels of said second inverter;

a second EX-OR logic gate (T19, T20, T21, T22) which receives the input carry and the output of said second inverter, and supplies the addition result (SN);

a first pair of series-connected P-MOS transistors (T3, T4) and a second pair of series-connected N-MOS transistors (T5, T6), said first and second pair being connected in series between two reference voltages, a bit of the first operand (A) being applied to gates of respective transistors of both pairs, the bit of the second operand (B) being brought to the gate of the other transistor of both pairs, the common node of said two pairs being connected to the output of said first transfer gate (T1, T2) and supplying an output carry, wherein for minima and comparison operations said elementary cells perform subtraction and individually further comprise:

third and fourth transfer gates (TG1, TG2) which receive at the transfer input the first and second operand respectively, and have a common transfer output (ANBN), and which are controlled by a first and second control signal (SEL, SELN) which in case of a minimum operation transfer to the output the inferior operand on the basis of the carry level outgoing from the last cell, and in case of comparison said first operand;

third (T34) and fourth (T35) P-MOS transistors and fifth (T36) and sixth (T37) N-MOS transistors, all connected in series between the two reference voltages, said third and fifth transistors receiving at the gate said result (SN) from the relevant elementary cell, said fourth and sixth transistors receiving at the gate a third (BEST) and a fourth (INFN) control signal; and seventh (T38) and eighth (T39) P-MOS transistors and ninth (T40) and tenth (T41) N-MOS transistors, all connected in series between the two reference voltages, the points common to said third and fourth and said seventh and eighth transistors being interconnected, the intermediate points in said series between said eighth and ninth and between said fourth and fifth transistors being interconnected to supply an output (U) of the unit, said eighth and tenth transistors receiving at the gate said common transfer output (ANBN), said seventh and ninth transistors receiving at the gate said fourth (INFN) and third (BEST) control signals respectively, said control signals taking up such logic levels that said output (U) in case of addition or subtraction, if there is no saturation, is said result (SN), otherwise said output is in a state indicative of saturation; in case of minimum said output (U) is said common transfer output; in case of comparison, if there is no saturation, said output (U) is said transfer output, otherwise said output (U) is in said state indicative of saturation.

2. The arithmetic-logic unit defined in claim 1, further comprising a control signal generating circuit, subdivided into a first part (DEC1) located close to the least significant elementary cell for generating said first, second, third and fourth control signals.

3. The arithmetic-logic unit defined in claim 2 wherein an operation code (CP) has the following values: for the addition "00", for the subtraction "01", for the minimum "1", for the comparison "10", characterized in that said first control signal (SEL) has "0" value for the comparison operation and output carry from the last cell for the minimum operation, said second control signal (SELN) being the complement of the first; said third control signal (BEST) is "0" for addition and subtraction operation, "1" for minimum operation and the complemented carry outgoing from the last cell for comparison operation; said fourth control signal (INFN) is ")" for minimum and comparison operations, "1" for subtraction, and the carry complemented outgoing from the last cell for the addition.

4. The arithmetic-logic unit defined in claim 3 wherein said first part (DEC1) of control signal generating circuit comprises third and fourth logic inverters (T57, T58, T59, T60) which generate complemented values of the most and least significant bits of the operation code (CP) and which feed a NOR logic gate generating said addition or subtraction selecting signal (SMST).

5. The arithmetic-logic unit defined in claim 4 wherein said second part (DEC2) of the control signal generating circuit comprises:

eleventh and twelfth P-MOS transistors (T75, T76) in series between supply voltage (Vcc) and the input of a fifth inverter (T80, T81) generating said third control signal (BEST), the gates of said eleventh and twelfth transistors receiving respectively the carry complemented of the last cell and the least significant bit of the operation code;

thirteenth and fourteenth P-MOS transistors (T87, T88) in series between the supply voltage (Vcc) and the input of sixth inverter (T85, T86) generating said fourth control signal (INFN), the gates of said thirteenth and fourteenth transistors receiving respectively the last cell carry implemented and the least significant bit of the operation code;

a fifteenth P-MOS transistor (T77) and sixteenth and seventeenth N-MOS transistors (T78, T79), all connected in series between supply voltage (Vcc) and the ground, the common point between the fifteenth and the sixteenth transistors being connected to the input of the fifth inverter, the gates of the fifteenth and sixteenth transistors receiving the most significant bit and the gate of the seventeenth transistor receiving the least significant bit of the operation code; and an eighteenth P-MOS transistor (T82) and nineteenth and twentieth N-MOS transistors (T83, T84), all connected in series between the supply voltage (Vcc) and ground, the point common between the eighteenth and nineteenth transistors being connected to the input of the sixth inverter, the gates of the eighteenth and nineteenth transistors receiving the most significant bit complemented and the gate of the twentieth transistor receiving the least significant bit of the operation code, the common points of said nineteenth and twentieth transistors being interconnected.

6. The arithmetic-logic unit defined in claim 1 wherein said state indicative of saturation is a logic level "1".

* * * * *